United States Patent [19]

Riley

[11] 3,889,638
[45] June 17, 1975

[54] METHOD FOR MAKING A BAIT BEDDING COMPOSITION
[76] Inventor: Patrick F. Riley, Bedford, Ohio
[22] Filed: Mar. 21, 1972
[21] Appl. No.: 236,778

[52] U.S. Cl.......................................... 119/1; 426/1
[51] Int. Cl............................................. A01k 67/00
[58] Field of Search................ 119/1; 99/3; 106/24; 43/55; 426/1

[56] References Cited
UNITED STATES PATENTS

| | | | |
|---|---|---|---|
| 2,715,067 | 8/1955 | Kamlet | 119/1 X |
| 2,841,113 | 7/1958 | Ebert | 119/1 |
| 2,849,981 | 9/1958 | Rose et al. | 119/1 |
| 2,867,055 | 1/1959 | Lebiedzinski | 119/1 X |
| 3,115,864 | 12/1963 | Wagner | 119/1 |
| 3,533,811 | 10/1970 | Clements et al. | 106/24 |
| 3,545,404 | 12/1970 | Loftus | 119/1 |

OTHER PUBLICATIONS

Vickerstaff, Physical Chemistry of Dyeing, 1954, p. 18.

Primary Examiner—James H. Czerwonky
Attorney, Agent, or Firm—Robb and Robb

[57] ABSTRACT

This disclosure is of a composition for bedding live bait, comprised of clumps or masses of fibrous material compacted so that such masses retain their non-uniform individual shapes and sizes which masses act as carriers for nutrients and retain moisture in sufficient quantity to keep the bait active and healthy, the individal clumps or masses resembling popcorn. The composition comprises water-saturated, shredded newspaper in combination with the addition of coal tar dye for coloring the water and the composition.

2 Claims, No Drawings

METHOD FOR MAKING A BAIT BEDDING COMPOSITION

OBJECTS OF THE INVENTION

It is a principal object of this invention to provide a bait bedding composition which will be susceptible of packaging in wet or dry form, such material when dry being of a light, airy nature, in which individual elements or masses are of irregular shape, and having about the characteristics and weight of popcorn. Such elements in turn may be suitably impregnated with nutrients to provide for the health and to promote the growth of bait when placed therein.

A more particular object of the invention is to provide a bedding compound for all kinds of bait such as worms used primarily for fishing purposes and not only for storage of the worms but to promote their growth and breeding, it being further understood that other types of bait used for fishing may likewise be stored and maintained in healthy condition in this composition.

Another object of the invention is to provide a composition for the storage and breeding of worms, which will retain moisture but at the same time retain its shape as to the individual constituents or elements thereof, nutrients in the form of dried ground corn, soluble powdered vegetables, fruits, yeast and the like being distributed throughout so that they are available for feeding of the bait stored therein.

Another object of the invention is to provide a worm bedding composition which may be made from inexpensive raw materials and packaged for sale in dry form so that it will be possible to store it for indefinite periods of time and wetted when necessary for worm or bait storage therein, at the same time promoting the growth of worms by making available nutrients carried by the individual masses or clumps of material of which the composition is comprised.

Other and further objects of the invention will be understood from a consideration of the description of the details of manufacture and use of the composition as the same are set forth hereinafter.

DESCRIPTION OF THE INVENTION

The bait composition contemplated hereby is derived from shredded paper which is made by soaking the same in water and agitating the material in such water so that it becomes a rather soupy mass, adding to this soupy mass the desired nutrients such as dried ground corn or other powdered vegetables, fruits, yeast, soy bean oil, cotton seed oil or the like.

The mixture thus provided is preferably colored by adding dye which will in turn preferably have sodium chloride therein, to the wet mass so that an attractive appearance may be provided when the product is finally finished.

In this instance, I contemplate the addition of a small quantity of brown dye, commercially available and having a coal tar base whereby the product will have a somewhat earth-like appearance. In the actual manufacture of the product herein described, I note that initially the shredded paper is agitated for a period of time and after the addition of the nutrients hereinbefore described, the mixture is drained through a suitable filtering means such as burlap, whereby the liquid is largely drained off and subsequently the material is dried in any preferred manner such as on a flat area or in a heated oven or similar drying means to speed up the removal of liquid therefrom.

It should be noted that the reason for soaking and stirring the newsprint is to change its general condition from a thin, hard, smooth surfaced material into a fibrous substance as heretofore described, and dried in that form so that upon breaking up the large masses the smaller parts resemble popcorn.

The fibers are not chopped into short, fine pieces so that a dusty condition would result when they are dry. The size of the individual clumps or masses resulting from the drying and breaking up of the same as heretofore set forth, is on the order of popcorn as well as of the consistency and lightness thereof, although much more irregularly shaped as will be appreciated.

By way of specific example, I have found that on a small quantity production basis, if I use about two pounds of paper, adding a sufficient quantity of water thereto to provide the soupy mixture referred to, in addition two to three ounces of dye to obtain the desired color, and further about two to three ounces of the dried nutrients, such as ground corn, vegetables, fruit, yeast, soybean oil or the like, a suitable ultimate material is provided when dried. The ground corn may desirably be triple ground corn known as lay mash.

The water which is drained off from the mixture may be used again with suitable make-up proportions to provide the concentrations and colors desired and the material formed as heretofore described in its dried condition may be packaged and dispensed thereafter.

When the ultimate user desires to use the material heretofore described, water is added to moisten the same in a suitable container, the bait being thereafter distributed over the material and ultimately making its way into the mass, being able to survive by feeding thereon and able to breed therein.

It should be emphasized that while I describe the basic ingredient as paper, I have found that printed newspaper is most effective to use to form the mixture, whereby the fibers are in effect rearranged into thicker, irregular shaped clumps, clusters or masses such that when they are ultimately dried they are clustered or compacted by weight of the wet material, the draining of the water and drying as drained, leaving the material compacted or in any other suitable manner, to provide the masses resembling popcorn as mentioned, the fibers being intertwined so that these masses retain their shape even when again subsequently dampened.

These masses are not merely large pieces of coagulated particles but are fibrous, cohesive, individual pieces which provide spaces between them when placed in a container so that worms or other bait can move about in the interstices to feed on the food carried by the fibers.

I have found that newsprint in the form of printed newspapers is actually superior to plain paper in ultimate results and that the bait appears to thrive more consistently and grow to larger size when the bedding composition is comprised as hereinbefore set forth.

I claim:

1. The method of making a bedding composition for live bait, comprising shredding newspaper, stirring the shredded newspaper until saturated in water, and adding coal tar dye to said composition for coloring said water and said composition.

2. The method as claimed in claim 1, combined with the further steps of compacting and drying said newspaper into irregularly shaped masses and subsequently breaking up said masses.

* * * * *

UNITED STATES PATENT OFFICE
CERTIFICATE OF CORRECTION

Patent No. 3,889,638            Dated June 17, 1975

Inventor(s) Patrick F. Riley

It is certified that error appears in the above-identified patent and that said Letters Patent are hereby corrected as shown below:

On the cover sheet insert:

-- [73] Assignee: Robert N. Heighberger and

Frank B. Robb, Timberlake, Ohio --.

Signed and Sealed this eleventh Day of November 1975

[SEAL]

Attest:

RUTH C. MASON  
Attesting Officer

C. MARSHALL DANN  
Commissioner of Patents and Trademarks